US008146972B2

(12) United States Patent
Petijean

(10) Patent No.: US 8,146,972 B2

(45) Date of Patent: Apr. 3, 2012

(54) DEVICE FOR FETCHING DIE-CUT CARTONBOARD BLANKS

(75) Inventor: Yannick Petijean, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 338 days.

(21) Appl. No.: 12/445,244

(22) PCT Filed: Oct. 10, 2007

(86) PCT No.: PCT/FR2007/001650

§ 371 (c)(1), (2), (4) Date: Jul. 7, 2009

(87) PCT Pub. No.: WO2008/043914

PCT Pub. Date: Apr. 17, 2008

(65) Prior Publication Data

US 2010/0068012 A1 Mar. 18, 2010

(30) Foreign Application Priority Data

Oct. 11, 2006 (FR) ..................................... 06 08897

(51) Int. Cl.
*B25J 15/06* (2006.01)

(52) U.S. Cl. ........... 294/186; 294/65; 414/737; 493/316

(58) Field of Classification Search .................... 294/65, 294/186–188; 414/627, 737; 901/40; 493/315–317
See application file for complete search history.

(56) References Cited

U.S. PATENT DOCUMENTS 3,299,611 A 1/1967 Hendrick et al.
3,471,997 A 10/1969 Berry
4,109,444 A 8/1978 Lee
4,348,853 A 9/1982 Morse et al.
4,629,446 A 12/1986 Focke
5,393,291 A 2/1995 Wingerter
5,421,685 A * 6/1995 Elmer et al. .................. 414/280

(Continued)

FOREIGN PATENT DOCUMENTS

DE 28 13 723 A1 10/1978
DE 34 29 761 A1 2/1986

OTHER PUBLICATIONS

International Search Report for PCT/FR2007/001650 dated Mar. 18, 2008.

*Primary Examiner* — Dean Kramer
(74) *Attorney, Agent, or Firm* — Sughrue Mion, PLLC

(57) ABSTRACT

The fetching device has an arm which captures die-cut blanks located in the magazine of an erecting machine for erecting these blanks to form boxes or the like. The extractor arm is provided with suckers and these suckers are supplied by circuits and. The circuits and are connected to each end of the arm and they are also provided with dispenser-type devive and, respectively, so that they can be active together or separately. The suckers are wholly or partly provided with multifunction three-way valves. These valves are able to allow as many suckers as possible to be selected and used for the operation of extracting each die-cut blank and to isolate the circuits from each other in order to deactivate any suckers which are to be shunted in order to erect said die-cut blanks, for example.

7 Claims, 1 Drawing Sheet

U.S. PATENT DOCUMENTS

| | | | | |
|---|---|---|---|---|
| 5,609,377 | A * | 3/1997 | Tanaka | 294/65 |
| 6,055,895 | A * | 5/2000 | Kanazawa | 83/24 |
| 7,628,434 | B2 * | 12/2009 | Bruce et al. | 294/65 |
| 2002/0153735 | A1 * | 10/2002 | Kress | 294/87.1 |
| 2004/0123571 | A1 | 7/2004 | Rozenfeld | |
| 2004/0226270 | A1 | 11/2004 | Smith | |

* cited by examiner

DEVICE FOR FETCHING DIE-CUT CARTONBOARD BLANKS

FIELD OF THE INVENTION

This invention relates to an improvement of the device for picking up cardboard cutouts that are stored in a storage location and in particular the storage location of a machine that forms said cutouts.

This pick-up device is in the form of an arm equipped with a plurality of suction cups that grip the cutout by means of a vacuum.

This invention in fact relates to an improvement of this extractor arm intended to improve its efficacy and make it universally applicable.

DESCRIPTION OF THE PRIOR ART

Depending on the type of forming machine and in particular depending on the size of the cutouts, the pick-up device can comprise one or more arms equipped with suction cups. In general, this extraction arm is adapted to a cutout model.

Due to advances in forming machines, which are increasingly versatile, it is becoming difficult to provide a pick-up device that is entirely effective for extracting all of the models of cutouts that might be formed on a single machine.

The operation of picking up the cutouts in the storage location can actually present problems due to the wide variety of formats.

The extraction arm cannot grasp the cutouts just anywhere; the suction cups must be positioned in precise locations on the cutout.

When the cutout is formed directly with the extraction arm, the suction cups may be operational only on a limited portion of said cutout.

Therefore, for certain cutout formats, the number of active suction cups may sometimes be inadequate for properly extracting the cutout that is held at the outlet of the storage location, thereby causing failures and incidents.

SUMMARY OF THE INVENTION

This invention proposes means that enable the extraction force available on the arm to be used optimally, and the disadvantages of the current pick-up devices to be overcome.

It enables devices capable of handling a very wide variety of cutout formats to be proposed with maximum cutout extraction efficacy, i.e. it enables said cutouts to be extracted without failure.

In general, the invention enables all situations based on user desires to be managed more easily, even if they involve a multitude of cutout and box formats or even of speeds, while offering a particularly effective extraction of all types of formats.

According to the invention, the device for picking up cutouts in the storage location includes—at least one extracting arm that is equipped with suction cups and—two circuits for activating said suction cups, which activation circuits are respectively connected to the ends of said arm, and are also equipped with means enabling them to act together or separately, and said suction cups are themselves equipped, entirely or partially, with multifunctional three-way valves, which valves are capable of enabling a maximum number of suction cups to be selected and implemented for the cutout extraction operation, and for isolating said circuits with respect to one another so as to enable the deactivation of the suction cup(s) to be bypassed for the forming of said cutout, for example.

Also according to the invention, the means for activating or inactivating the suction cup feed circuits consist of distributors that enable rapid venting of the circuit in the event of an interruption of the supply to the suction cups supplied by said circuit.

According to a preferred embodiment of the invention, the length of the cutout extraction arm corresponds substantially to the dimension of the largest of said cutouts in the case of cutouts for the “American box” construction, and slightly smaller in the case of cutouts for the “wrap-around”-type box construction.

Also according to the invention, the suction cup supply circuits are, upstream of the arm, in the form of a double pipe, which pipe cooperates with a clamp system that ensures the attachment and positioning of said pipe on a line that corresponds to the neutral axis of the pivot shaft between the support of said arm and the part, secured to the structure of the machine, to which said support is pivotably connected.

BRIEF DESCRIPTION OF THE DRAWINGS

However, the invention will be further detailed in the following description with the appended drawings, provided for indicative purposes, in which.

DETAILED DESCRIPTION OF THE INVENTION

Figures 1, 2, 3, 4, 5, 6:
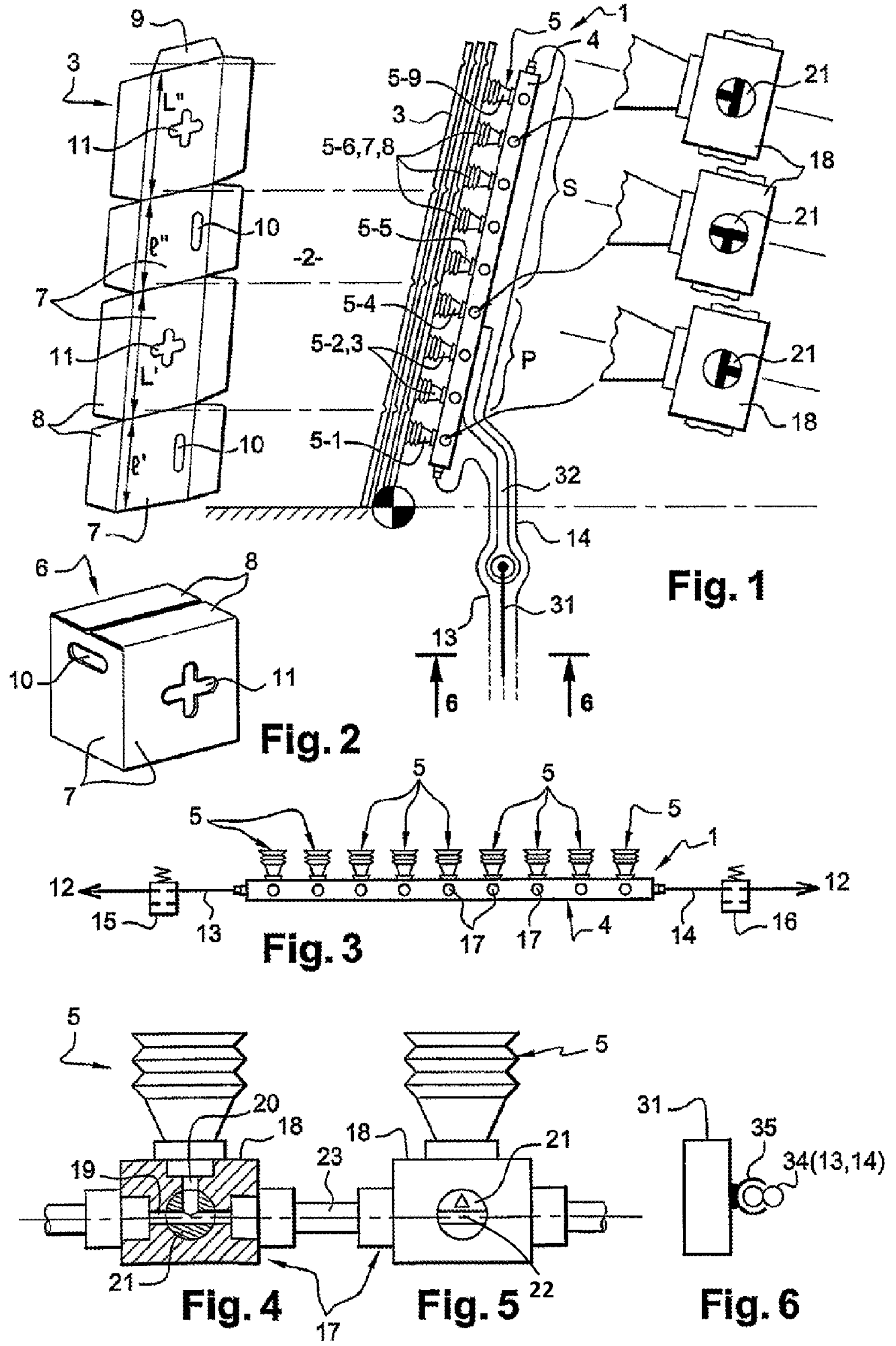
FIG. 1 diagrammatically shows a pick-up device associated with the storage location of a machine for forming cutouts, and a cutout model also appears in this figure, and in particular a wrap-around-type cutout.
FIG. 2 shows the box produced from the cutout shown in FIG. 1.
FIG. 3 diagrammatically shows the arm of the pick-up device and the two suction cup supply circuits, which circuits are each equipped with a distributor.
FIG. 4 is a partial section of the extractor arm at the level of one of the suction cups in order to show the three-way valve.
FIG. 5 is an external view of the extractor arm, at the level of one of the valves.
FIG. 6 is a sectional view of the part that supports the extractor arm, showing the suction cup supply circuit installation system.

As shown in FIG. 1, the pick-up device 1 is arranged at the outlet of the storage location 2 of a machine for forming cutouts 3, which cutouts are stored in said storage location.

The pick-up device 1 consists of an extraction arm 4 in the form of an elongate bar, and said bar 4 is equipped with a plurality of suction cups 5 that grip, by means of a vacuum, the cutout 3 at the outlet of the storage location 2.

The arm 4 can be moved by suitable means, which are not shown, in order to transfer the cutout 3 at the level of a forming station, for example.

The cutout 3 shown in FIG. 1 is a “wrap-around”-type box cutout. This cutout comprises sides 7, flaps 8 and an assembly tongue 9. It can also comprise, as shown in the figure, handles 10 arranged in the small sides, for example, and/or windows 11 on the other sides, which results, after forming, in a box 6 as shown in FIG. 2.

In addition to the cutouts of which the formats can change, the arm 4 of the pick-up device can therefore be made to handle cutouts 3 that comprise orifices such as handles 10 and/or windows 11.

Opposite these orifices, the suction cups 5 of the arm(s) 4 are ineffective, and, moreover, cause the other suction cups to become less effective due to the leakage that they generate.

This problem exists regardless of the number of arms 4; with a single arm 4, certain suction cups 5 may be located opposite windows 11; with two arms 4, certain suction cups 5 may be located opposite handles 10.

To grip and move the cutouts 3, without failure, the arm 4 has a length that is, for example, approximately the dimensions of the largest format of cutout 3, and it comprises a large number of suction cups 5.

The length of the arm 4 may correspond to the dimension of the "American box"-type cutouts 3 and it can be slightly smaller if it is a "wrap-around"-type cutout 3.

This arm 4 is also arranged so as to be capable of being easily adjusted to the various possible cases, such as the box shown in FIG. 2, i.e. to be capable of gripping cutouts 3 equipped with diverse and varied orifices placed just about anywhere on said cutout.

This arm 4, shown in FIG. 3, is connected to a vacuum source 12, at the level of each of its ends by circuits 13, 14.

The circuits 13 and 14 are separated and they each comprise, as also shown in FIG. 3, distributors 15 and 16, respectively, which are supplied by the common vacuum source 12.

These distributors 15 and 16 open or close the circuits 13 and 14, respectively, and they also enable the suction cups 5 of the circuit that has been closed to be vented so that the suction cup(s) 5 do not remain stuck to the cutout 3.

Preferably, each suction cup 5 comprises its own three-way valve 17. These valves 17 have a plurality of functions; they enable the suction cups 5 that are operational to be selected, and, in addition, they enable the circuits 13, 14 to be separated in a chosen location on the arm 4, according to the type and format of the cutouts 3.

These valves 17 are arranged at the level of each suction cup 5. They consist, as shown in FIGS. 4 and 5, of a body 18 that comprises three ports. This body 18 is traversed by a conduit 19 and comprises a transverse conduit 20 that is located in the axis of the suction cup 5 and supplies the latter.

The supply to each suction cup 5 is provided by means of a ball 21 that is housed in the body 18. This ball 21 is arranged so as to enable three possibilities:

- supplying the suction cup 5,
- bypassing said suction cup 5, i.e. cutting its supply without closing the conduit 19,
- closing the conduit 19 while supplying said suction cup 5, i.e. isolating circuits 13 and 14 from one another.

The ball 21 is maneuvered very simply, with a screwdriver, for example, that is engaged in the slot 22, shown in FIG. 5. A reference, in the form of an arrow, shows the operator the direction of the ball 21.

The suction cups 5 are connected to one another by pipes 23 and are secured to the arm 4, which can have a U-shaped cross-section. The arm 4 can also have a plurality of drilled blocks, not shown, which in turn comprise a plurality of suction cups 5; it can even consist of a simple, single bar that is drilled over its entire length and on which the various suction cups are implanted directly.

The arm 4 enables the cutouts 3 to be picked up in the storage location 2, and, in particular, as shown in FIG. 1, "wrap-around"-type cutouts; this extraction is performed with maximum efficacy because said arm grips said cutout over a large portion of its height.

This type of cutout 3, as shown at the inlet of the storage location 2, therefore comprises a plurality of sides 7 that are marked l', l", L' and L", as well as flaps 8 on each side and the adhesive tongue 9 mentioned earlier.

As shown in FIG. 1, the arm 4 can have suction cups 5 in contact with a plurality of sides of the cutout 3 in order to perform the extraction. Not all of the suction cups 5 are operational; they are operational according to the position of the ball 21, as shown in FIG. 1.

In this FIG. 1, the suction cup 5-1, which is placed on the l' side, is bypassed; it is deactivated in order to extract cutout 3 so as not to interfere with the folding of this l' side during the erecting of said cutout.

Also in this example, the suction cups 5-2 and 4 are active, as are suction cups 5-5 to 7 and suction cup 5-9.

Suction cups 5-3 and 5-8 are inactive and not supplied; but they leave the corresponding circuits open.

It is at suction cups 5-4 or 5-5 that the separation of the two supply circuits 13 and 14 takes place in order to enable, after extraction of the cutout 3, the deactivation of the suction cups 5-5 to 9; this deactivation of the suction cups 5-5 to 9 is essential for the erecting of said cutout 3.

In FIG. 1, the separation of circuits 13 and 14 is performed at the valve 5-4. This valve 5-4 enables the corresponding suction cup to be supplied, but it closes circuit 13 and, consequently, circuit 14.

The operator intervenes, when changing the cutout 3 formats, on the various valves 17, and in particular the balls 21, in order to active and/or deactivate the suction cups 5 and in order to form two sectors: a sector P, which can be qualified as the main sector, corresponding to the L' side of said cutouts and which is assigned both to the extraction and the erecting thereof, and a sector S, which is assigned only to the extraction of the cutouts 3.

The activation of each sector P and S is performed automatically by acting on the distributors 15 and 16; the two distributors 15 and 16 simultaneously supply all of the suction cups 5 previously selected for the cutout 3 extraction operation, and then the distributor 16 closes the supply of the circuit 14 and opens said circuit 14 to deactivate the suction cups 5-5 to 9, freeing sides l" and L' of the cutout 3, which are intended to be folded.

The two circuits 13 and 14 that supply the suction cups 5 consist of pipes that accompany the arm 4 in its pivoting movement, for example.

FIG. 6 is a sectional view of the part 31 that is secured to the structure of the cutout 3 forming machine, and it is on this part 31 that the arm 4 is pivotably connected by means of its support 32.

The circuits 13 and 14 are combined in one pipe 34, which is a double pipe. This pipe 34 is snapped into a clamp system 35, and these clamps are arranged on the part 31 and on the support 32 of the arm 4.

This assembly has the advantage of being simple; it also enables the pipe 34 to be installed by the pivot shaft located between the support 32 of the arm 4 and the part 31, which is secured to the structure of the machine.

The deformation of this pipe 34 is thus better controlled; it is more regular and the risks associated with friction with other parts are eliminated.

The invention claimed is:

1. A device for picking up cardboard cutouts in a storage location of a machine so as to assemble the cutouts in the form of boxes, the device comprising

- at least one extracting arm that is equipped with suction cups and
- two circuits that supply said suction cups, which circuits are respectively connected to each end of said arm, and are configured to act together or separately, and one or more of said suction cups is equipped with a multifunctional three-way valve, the valve or valves configured to enable a maximum number of suction cups to be selected and implemented for the cutout extraction operation, and for isolating said circuits with respect to one another so as to enable the deactivation of one or more of said suction cups to be bypassed in order to form said cutouts.

2. The device for picking up cutouts according to claim 1, comprising distributors which provide rapid venting of the suction cups when the corresponding circuit is interrupted so as to activate or deactivate the circuits that supply the suction cups.

3. The device for picking up cutouts according to claim 1, wherein a length of the extracting arm corresponds substantially to a dimension of a largest format of said cutouts.

4. The device for picking up cutouts according to claim 3, wherein said cutouts are American box cutouts.

5. The device for picking up cutouts according to claim 1, wherein the circuits are, upstream of the arm, in the form of a flexible double pipe, which pipe cooperates with a clamp system that ensures attachment and positioning of said pipe on a line that passes through a pivot shaft located between a support of said arm and a part secured to the structure of the machine.

6. The device for picking up cutouts according to claim 1, wherein a length of the extracting arm is smaller than a dimension of a largest format of said cutouts.

7. The device for picking up cutouts according to claim 6, wherein said cutouts are wrap-around box cutouts.

* * * * *